(12) United States Patent
Naaijen et al.

(10) Patent No.: US 12,077,265 B1
(45) Date of Patent: Sep. 3, 2024

(54) SHIP MOTION PREDICTION SYSTEM AND METHOD

(71) Applicant: Next Ocean B.V., Delft (NL)

(72) Inventors: Peter Naaijen, Rotterdam (NL); Dorus Karel Roozen, Delft (NL)

(73) Assignee: Next Ocean, B.V., Delft (NL)

( * ) Notice: Subject to any disclaimer, the term of this patent is extended or adjusted under 35 U.S.C. 154(b) by 448 days.

(21) Appl. No.: 17/469,072

(22) Filed: Sep. 8, 2021

(51) Int. Cl.
| | |
|---|---|
| *B63B 79/30* | (2020.01) |
| *B63B 49/00* | (2006.01) |
| *B63B 79/10* | (2020.01) |
| *G06N 5/02* | (2023.01) |

(52) U.S. Cl.
CPC .............. *B63B 79/30* (2020.01); *B63B 49/00* (2013.01); *B63B 79/10* (2020.01); *G06N 5/02* (2013.01)

(58) Field of Classification Search
USPC .......................................................... 701/21
See application file for complete search history.

(56) References Cited

U.S. PATENT DOCUMENTS

| | | | | |
|---|---|---|---|---|
| 6,064,924 | A * | 5/2000 | Fleischmann | G01S 13/956 701/16 |
| 6,611,737 | B1 * | 8/2003 | El-Tahan | G05D 1/0206 701/472 |
| 8,215,252 | B1 * | 7/2012 | Chun | B63B 39/08 440/51 |
| 11,719,831 | B2 * | 8/2023 | Anderson | G07C 5/008 701/32.3 |
| 2017/0256170 | A1 * | 9/2017 | Hashizume | G08G 3/02 |
| 2017/0313269 | A1 * | 11/2017 | Breed | G01F 23/2962 |
| 2018/0372494 | A1 * | 12/2018 | Tamashima | G01C 21/203 |
| 2019/0161152 | A1 * | 5/2019 | Kusters, Jr. | G01S 13/88 |
| 2021/0129952 | A1 * | 5/2021 | Rostrøm | B63B 79/30 |
| 2021/0394875 | A1 * | 12/2021 | Atherton | B63B 79/40 |

\* cited by examiner

*Primary Examiner* — Hunter B Lonsberry
*Assistant Examiner* — Robert Louis Pinkerton
(74) *Attorney, Agent, or Firm* — Hoffmann & Baron, LLP

(57) ABSTRACT

A ship state prediction system for predicting a ship state is based on measured wave fields. The ship state prediction is included in a ship state visualization which is shown on a display. The ship state visualization may further include an indication of a maximum prediction time and a user variable time that splits the ship state prediction into a non-updated portion and an updated portion.

17 Claims, 2 Drawing Sheets

SHIP MOTION PREDICTION SYSTEM AND METHOD

FIELD OF THE INVENTION

The present invention is related to a ship state prediction system.

The present invention also relates to a method for predicting a ship state.

BACKGROUND OF THE INVENTION

In US2019161152 systems and a method are described that can enable forecasting of ship motions and the displaying of such forecasts to users. The ship motion forecasting systems and methods provide users with graphical indication of ship motion forecasts in the form of operational period indicators. The ship motion forecast system of US2019161152 comprises a radar, a display, a processor and a ship motion forecasting program. The program is configured to generate on the at least one display a graphical indication of ship motion forecasts over a future time period. The graphical indication includes a first operational period indicator for ship motion forecasts and a second operational period indicator for ship motion forecasts.

During ship operations, for example during ship operations for servicing off-shore structures and/or floating structures such as off-shore wind turbines, sudden and unexpected ship motion due to waves may cause situations wherein personal on the ship may not be able to perform their duties. As a result these operations suffer from downtime due to uncertain ship state conditions e.g. as a result of wave motions.

OBJECT OF THE INVENTION

The present invention aims to provide an improved ship state predicting system and method, e.g. in view of reducing ship operations downtime.

SUMMARY OF THE INVENTION

The first aspect of the present invention is related to a ship state prediction system comprising a processor, a wave sensor system and a display connected to the processor, wherein the wave sensor system is adapted to measure, in real time, wave fields and wherein the wave sensor system is configured for providing the measured data wave fields to the processor, wherein the processor is configured to continuously determine a ship state prediction of a ship state in a future time period based on the wave fields measured at a current time, wherein the processor is configured to determine an accuracy of the ship state prediction in the future time period, wherein the processor is further configured to determine a maximum prediction time which corresponds to a length of the future time period wherein the accuracy drops below a pre-set accuracy, wherein the processor is configured to generate a ship state visualization to be displayed on the display, wherein the ship state visualization comprises a time axis comprising a time range including the current time and the future time period, relative to the current time, and wherein the ship state visualization comprises a representation of the ship state prediction which is displayed on the future time period of the time axis, and wherein the ship state visualization comprises an indication of the maximum prediction time.

The processor of the ship state prediction system is configured to continuously determine a ship state prediction of a ship state. The ship state may change due to wave induced motions of the ship. The ship state may be one of ship position, ship velocity or ship acceleration. The ship state may be predicted for a ship as a whole, e.g. relative to the center of gravity thereof, or for a part of the ship, e.g. for a crane, e.g. a part of a crane such as a crane tip, or a gangway. The ship state may further be a ship state severity index which indicates, e.g. for a part of the ship, the predicted severity of a predicted ship state. For some off-shore operations it is not knowledge of predicted wave motions that is most important, rather the severity of the wave induced state which is more important. The ship state severity index provides a predicted measure of the severity of one or more states combined, e.g. motion, position, acceleration, of the ship or part thereof.

The prediction system of the invention comprises a wave sensor system adapted to measure, e.g. at a distance around a ship, wave fields, e.g. data on wave fields. The wave sensor system may comprise one or more sensors to measure characteristics of the wave field, such as wave height, wave steepness, wave velocity, etc. The one or more sensors of the wave sensor system may be one of the following: a radar, e.g. an incoherent or coherent x-band radar, a lidar, or a buoy or collection of buoys. For example, the radar may be provided on a ship to measure surrounding wave fields. For example, the buoy may be placed a certain distance from a ship. For example, various buoys may be provided, e.g. surrounding a ship or a wind turbine, to measure wave fields. The prediction system may be provided with various kinds of sensors, such as a combination of radar and buoys. Other embodiments are possible, for example the wave sensor system may be provided away from the rest of the prediction system, e.g. the wave sensor system may be provided on land whereas the rest of the wave prediction system is provided on a ship.

The wave sensor system may further comprise a wind sensor and/or a current sensor. In such embodiments the ship state visualization may further be determined based on measured wind conditions and/or current conditions. This may allow to increase the accuracy of the ship state prediction system e.g. because the ship state prediction is based on multiple different measurements.

The processor is configured to continuously determine a continuously updated ship state prediction of a ship state in a future time period based on the wave fields measured at a current time. The future time period is a time period in the future relative to the current time, e.g. the coming 20 seconds, the coming 30 seconds, the coming 2 minutes. The current time is continuously changing. New wave field measurements may be provided and the processor continuously, e.g. each time updated wave field measurements are provided, determines, e.g. based on the most recently provided measured wave fields by the wave sensor system, an updated ship state prediction based on the measured wave field measurements until the current time.

The processor is configured to determine an accuracy of the ship state prediction in the future time period. The accuracy may be determined as a function of the future time period, e.g. the determined accuracy may vary depending on the amount of time into the future relative to current time at which the accuracy is determined. As the amount of time into the future time increases the accuracy may be expected to decrease.

The accuracy may be determined based on the length of the future time period for which the ship state prediction is determined. For example, if the ship state prediction is determined for a future time period which extends 20 seconds into the future the prediction may be expected to be more reliable than a ship state prediction determined for a future time period which extends 2 minutes into the future.

The processor is further configured to determine a maximum prediction time which corresponds to a length of the future time period where the accuracy drops below a pre-set accuracy. The accuracy of the ship state prediction provides a measure of how reliable the ship state prediction is. By determining a length of the future time period, on which ship state predictions depend, for which the accuracy drops below a pre-set accuracy the processor determines at which point in the future time the ship state prediction is considered to be no longer reliable, e.g. based on an input according to user preference or according to a pre-set regulation. For example, at this point it may be decided that no ship operations which take longer than the maximum prediction time should be performed.

The processor is configured to generate a ship state visualization to be displayed on the display. The display may be provided on the helm of a ship or at other relevant locations like a crane operator cabin. The display may comprise a single display or more than one display. Multiple displays may be provided whereon the same ship state visualization is displayed or multiple displays may be provided such that a part of the ship state visualization is provided on each of the displays separately.

The ship state visualization comprises a time axis comprising a time range including the current time and the future time period, relative to the current time. The current time may be indicated by a current time indicator. The time axis may be marked to indicate various points in time such as the current time and the future time, e.g. $t=0$, $t=5$, $t=10$, etc. The time range depicted on the time axis may change depending on the situation and/or user requirements.

The ship state visualization comprises a representation of the ship state prediction which is displayed on the future time period of the time axis, and wherein the ship state visualization comprises an indication of the maximum prediction time. The representation of the ship state prediction may be embodied as a side scrolling graph which scrolls to the left or right as the current time evolves, such that the point of the time axis indicating current time stays aligned with the point on the graph representing current time.

The indication of the maximum prediction time may be embodied as a fade out or a color change of the representation of the ship state prediction. For example, the representation of the ship state prediction may start to fade out, e.g. by using grey-scale or a change in brightness, at the point in future time where the accuracy drops below the pre-set accuracy. Additionally, the representation of the ship state prediction may completely disappear at the point in future time where the accuracy drops below a second pre-set accuracy. Other embodiments of the indication of the maximum prediction time are possible, for example the maximum prediction time may be indicated by a numerical value on the display representing the time, e.g. in seconds, into the future time where the accuracy drops below the pre-set accuracy.

In embodiments the processor is configured to determine the accuracy of the ship state prediction by correlating one or more previously determined ship state predictions to one or more measurements of the ship state corresponding to the one or more previously determined ship state predictions, wherein the ship state measurements are measured by a ship state sensor. A previously generated ship state prediction may be compared to the measurement of the ship state of the corresponding the time period, e.g. for which the ship state prediction was determined. By comparing, e.g. correlating, these the accuracy of the ship state prediction may be determined. This may give the accuracy of a ship state prediction in a future time period, relative to the current time. By comparing multiple ship state prediction with corresponding ship state measurements the so determined accuracy may be more reliable.

The visualization of the ship state prediction may further comprise an indication of the determined accuracy, e.g. as an overlay over the representation of the ship state prediction or as a number which corresponds to the minimal accuracy determined for the ship state prediction in the future time period.

For example, the processor determines the accuracy of the future time period $t=30$ to $t=40$ for multiple previously determined ship state predictions by comparing these previously determined ship state predictions to ship state measurements corresponding to these ship state predictions in absolute time. In a same way the accuracy for the future time period $t=40$ to $t=50$ is determined. If it is found that the accuracy for the future time period $t=30$ to $t=40$ is above the pre-determined minimum accuracy, and that the accuracy for the future time period $t=40$ to $t=50$ is below the pre-determined minimum accuracy, then the maximum prediction time is indicated as $t=40$ and, for example, the ship state predictions are visualized on the display up to $t=40$, and not visualized from $t=40$ onwards.

In an embodiment the representation of the ship state prediction displayed on the display comprises a non-updated portion between current time and a user variable time in the future time period and an continuously updated portion after the user variable time in the future time period. Because the ship state prediction is continuously updated, the representation of the ship state prediction on the display may change. If such a change happens close to the current time, for example if such a change changes the ship state prediction from below a pre-set limit value to above the pre-set limit value, this change may reduce the perceived reliability of the system. In order to prevent this reduction the representation of the ship state prediction of this embodiment is split into a portion that is not updated, e.g. that only scrolls, and a portion that is updated, e.g. that additionally changes the predicted ship state. These two portions are determined by the user variable time, which is a point in the future time period determinable by the user. Advantageously the user variable time lies before the maximum prediction time so it is more likely that changes in the ship state prediction are smaller because the accuracy is higher.

The second aspect of the invention relates to a ship state prediction system comprising a processor, a wave sensor system and a display connected to the processor, wherein the wave sensor system is adapted to measure, in real time, wave fields and wherein the wave sensor system is configured for providing the measured wave fields to the processor, wherein the processor is configured to continuously determine a continuously updated ship state prediction of a ship state in a future time period based on the wave fields measured at a current time, wherein the processor is configured to generate a ship state visualization to be displayed on the display, wherein the ship state visualization comprises a time axis comprising a time range including the current time and the future time period, relative to the current time, and wherein the ship state visualization comprises a representation of the ship state prediction which is displayed on the future time period of the time axis, and wherein the representation of the ship state prediction displayed on the display comprises a non-updated portion between current time and a user variable time in the future time period and a continuously updated portion after the user variable time in the future time period.

The system of the second aspect of the invention does not necessarily determine the accuracy of the ship state prediction but does comprise the user variable time separating the non-updated portion from the updated portion of the representation of the ship state prediction. In this aspect the representation of the ship state prediction is not updated between the current time and the user variable time and is updated after the user variable time. This prevents the representation of the ship state prediction to suddenly change close to the current time which increases perceived reliability of the system.

For example, the processor determines a ship state prediction at a current time t=0 for a future time period of 20 seconds, corresponding to the period t=0 to t=20. The user variable time is set to t=10. Thus the representation of the ship state prediction is not updated, but may scroll, between t=0 and t=10 and the representation is updated between t=10 and t=20.

In embodiments the processor is further configured to determine an accuracy of the ship state prediction in the future time period, wherein the processor is further configured to determine a maximum prediction time which corresponds to a length of the future time period where the accuracy drops below a pre-set accuracy, and wherein the ship state visualization comprises an indication of the maximum prediction time.

In embodiments the processor is configured to determine the accuracy of the ship state prediction by correlating one or more previously determined ship state predictions to one or more measurements of the ship state corresponding to the one or more previously determined ship state predictions, wherein the ship state measurements are measured by a ship state sensor.

In embodiments of the first and second aspect wherein the processor is further configured to determine if the ship state prediction exceeds a pre-set limit value and wherein the ship state visualization further comprises an indication when the ship state prediction exceeds the pre-set limit value. This may allow for faster interpretation of the ship state prediction. For example, the exceeding of the pre-set value of the ship state prediction is indicated by a change in color of the ship state prediction in the ship state visualization. For example, portion of the ship state prediction where the ship state prediction, e.g. the motion severity index, is below the pre-set value, the representation of the ship state prediction is green and where the ship state prediction is above the pre-set value the representation is red.

In embodiments of the first and second aspect the prediction system is configured to indicate a time duration until the ship state prediction exceeds the pre-set limit value. This may be indicated by a countdown timer on the ship state visualization. This may allow to get a precise indication on the amount of time left before ship operations should be halted.

In embodiments of the first and second aspect the prediction system further is configured to indicate if the ship state prediction does not exceed the pre-set limit value during a pre-set time period. This allows to indicate windows in the future time period wherein ship operations of a certain length may be performed. The indication may be provided by visualizing the ship state prediction in green for those stretches of future time where the ship state is predicted to be below the pre-set time limit value for the pre-set time period, and changing the color of the ship state prediction, e.g. to yellow, when the predicted ship state is below the pre-set limit value, but the criterion for the pre-set time period is not met. In another embodiment a stop light may be provided which indicates, e.g. by changing lights, when the predicted ship state is below the pre-set limit value, but the criterion for the pre-set time period is not met. For example, the stop light may indicate this with the yellow or orange light.

In embodiments of the first and second aspect the ship state visualization further comprises a stop light for indicating when the ship state prediction exceeds a pre-set limit value and/or for indicating when the ship state prediction does not exceed the pre-set time limit value during the pre-set time period. The stop light may have a first, e.g. red, light for indicating when the limit value is exceeded and a second, e.g. green, light for indicating when the limit value is not exceeded. The stop light may further have a third, e.g. orange or yellow, light for indicating that the stop light is about, e.g. based on the maximum prediction time or based on a user indicated value, e.g. based on a to be performed operation, to change color from the second to the first light.

In embodiments of the first and second aspect the ship state visualization further comprises a representation of a wave state prediction based on the measured wave fields. By directly presenting information related to the wave fields the prediction system may present more complete information.

In an embodiment of the first and second aspect the processor is further configured to actuate an audible warning signal when a ship state prediction exceeds, or is about to exceed, a pre-set value.

The first aspect of the invention is further related to a method for predicting a ship state wherein the method comprises:

measuring, in real time, wave fields with a wave sensor system;
 providing the measured wave fields to a processor;
 continuously determining, by the processor, a ship state prediction of a ship state in a future time period based on the wave fields measured at a current time;
 determining, by the processor, an accuracy in the future time period of the ship state prediction;
 determining, by the processor, a maximum prediction time which corresponds to the length of the future time period where the accuracy of the ship state prediction drops below a pre-set accuracy;
 generating, by the processor, a ship state visualization comprising a time axis comprising a time range including the current time and the future time period, relative to the current time, and wherein the ship state visualization comprises a representation of the ship state prediction which is displayed on the future time period of the time axis, and wherein the ship state visualization comprises an indication of the maximum prediction time; and
 displaying the ship state visualization on a display.

In embodiments of the method of the first aspect the accuracy of ship state prediction is determined by the processor by correlating one or more previously determined ship state predictions to one or more measurements of the ship state corresponding to the one or more previously determined ship state predictions, wherein the ship state measurements are measured by a ship state sensor.

In embodiments of the method of the first aspect the ship state prediction displayed on the display comprises a non-updated portion between current time and a user variable time in the future time period and a continuously updated portion before the user variable time in the future time period.

The second aspect of the invention is further related to a method for predicting a ship state wherein the method comprises:
  measuring, in real time, wave fields with a wave sensor system;
  providing the measured wave fields to a processor;
  continuously determining, by the processor, a ship state prediction of a ship state in a future time period based on the wave fields measured at a current time;
  generating, by the processor, a ship state visualization comprising a time axis comprising a time range including the current time and the future time period, relative to the current time, and wherein the ship state visualization comprises a representation of the ship state prediction which is displayed on the future time period of the time axis, and wherein the representation of the ship state prediction displayed on the display comprises a non-updated portion between current time and a user variable time in the future time period and an continuously updated portion after the user variable time in the future time period; and
  displaying the ship state visualization on a display.

In embodiments of the method of the second aspect the method further comprises:
  determining, by the processor, an accuracy, as a function of the future time period, of the ship state prediction;
  determining, by the processor, a maximum prediction time which corresponds to the length of the future time period where the accuracy of the ship state prediction drops below a pre-set accuracy;
  and wherein the ship state visualization comprises an indication of the maximum prediction time.

In embodiments of the method of the second aspect the accuracy of ship state prediction is determined by the processor by correlating one or more previously determined ship state predictions to one or more measurements of the ship state corresponding to the one or more previously determined ship state predictions, wherein the ship state measurements are measured by a ship state sensor.

In embodiments of the method of the first or second aspect the method further comprises:
  determining, by the processor, if the ship state prediction exceeds a pre-set limit value; and wherein the ship state visualization further comprises an indication, which indicates when the ship state prediction exceeds the pre-set limit value.

In embodiments of the method the method further comprises:
  indicating a time duration until the ship state prediction exceeds the pre-set limit value; and/or
  indicating if the ship state prediction does not exceed the pre-set limit value during a pre-set time period.

It will be appreciated that features discussed herein with reference to one aspect of the invention are also combinable with one or more other aspects of the invention, e.g. as evidenced by the drawings and the description thereof.

The invention will now be described with reference to the appended drawings.

DETAILED DESCRIPTION OF THE EMBODIMENTS

Figure 1:
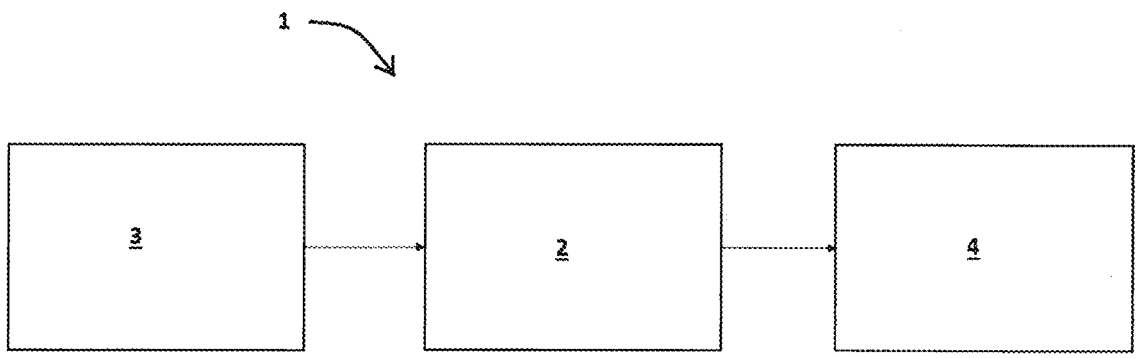
FIG. 1 schematically shows the ship state prediction system.

FIG. 1 schematically shows the ship state prediction system 1, wherein the processor 2, wave sensor system 3 and display 4 are shown. The wave sensor system 3 and processor 2 are connected to each other in the figure by an arrow to indicate the transfer of the measured wave fields from the wave sensor system 3 to the processor 2. Similarly the processor 2 and the display 4 are connected to each other in the figure with an arrow to indicate that the display 4 displays the ship state visualization 10 generated by the processor 2. Information, e.g. instructions or commands, may flow in a direction against the arrow. For example, the display 4 may be a touch display 4 wherein a user provides instructions, such as instructions on the variable user time 11, to the processor 2. Similarly the processor 2 may send instructions to the wave sensor system 3, such as a request for information on wave fields.

The connection between the processor 2, wave sensor system 3 and display 4 may be wired or wireless. The processor 2, wave sensor 3 and display 4 do not have to be at the same place, e.g. on a ship. For example the wave sensor 3 and processor 2 may be provided on an off-shore structure and the display 4 may be provided on a ship.

Figure 2:
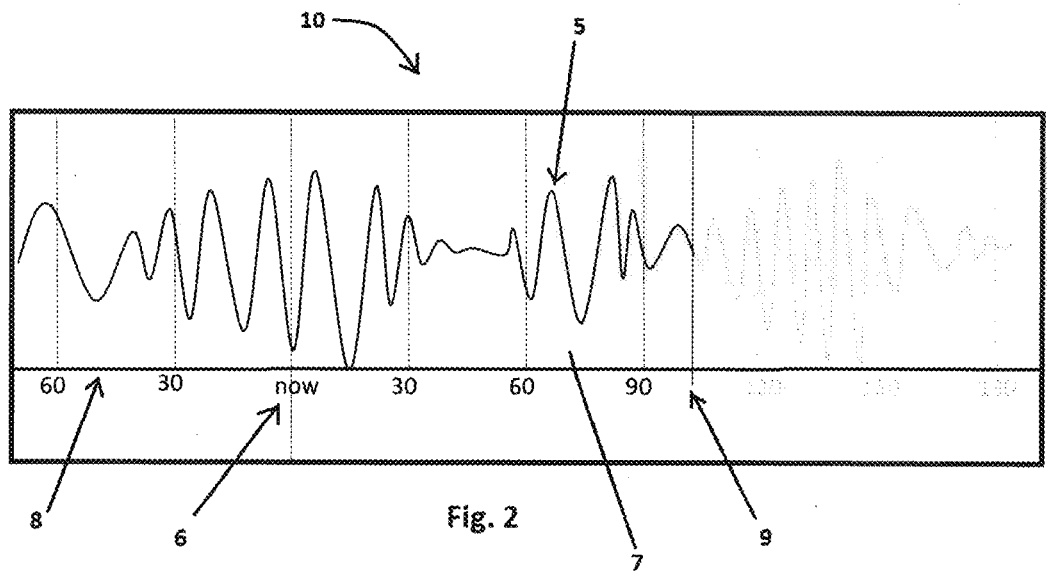
FIG. 2 schematically shows a first embodiment of the ship state visualization.

FIG. 2 schematically shows a first embodiment of the ship state visualization 10 generated by the processor 2 based on measured wave fields by the wave sensor system and displayed on the display 4.

The ship state visualization 10 comprises a time axis 8 comprising a current time 6, indicated by the wording "now" and a vertical line, and a future time period 7 to the right of the current time 6.

The ship state prediction 5 is shown as a continuous graph that extends from the current time 6 towards the future time at 180. The graph representing the ship state prediction 5 also extends in the past to the left of the current time 6, this may be a representation of a measured ship state or it may be a representation of a ship state prediction 5 corresponding to a future time period 7 that is in the past relative to the current time 6 or both.

The ship state visualization 10 further comprises a indication of the maximum prediction time 9, which is depicted as a vertical line around the future time point 100 and also by the fading of the ship state prediction 5. The maximum prediction time 9 clearly indicates to a user that the ship state prediction 5 to the right of the maximum prediction time 9 is deemed unreliable by the system. The maximum prediction time 9 corresponds to the time in the future time period 7 where the processor 2 determines that the accuracy drops below a pre-set accuracy.

The processor 2 is configured to continuously determine the continuously updated ship state prediction 5. As a result the representation of the ship state prediction 5 on the ship state visualization 10 may be seen to scroll from right to left when the ship state prediction system 1 is in use. In this case, also the shape of the representation of the ship state prediction 5 may be seen to be changing, due to updated predictions, and the position of the maximum prediction time may shaft along the time axis 8 due to a changing accuracy as determined by the processor.

The range of the time axis 8 shown in the figure runs from t=−60 into the past to t=180 into the future. The range of the time axis 8 may be changed, either by a user or by the processor 2. For example, the processor 2 may determine that the maximum prediction time lies around t=200. In this case the range of the time axis 8 may be changed to include the maximum prediction time 9. It is also possible that the range of the time axis 8 is fixed, in this case the ship state visualization 10 may comprise an indication that the maximum prediction time 9 lies outside the shown range.

The processor 2 may further be configured to determine if the ship state prediction 5 exceeds a pre-set limit value. For example, as shown in the figure the ships state prediction does is relatively flat between t=30 and t=60, thus the ship state prediction 5 may be below the pre-set limit value. This may be indicated by having the representation of the ship state prediction 5 be green. The ship state prediction 5 does fluctuate more in the range t=60 to t=90. In this range the ship state prediction may exceed the pre-set limit value and the representation of the ships state representation may be red. Other colors or other ways of indicating if the ship state prediction exceeds the limit value are possible.

Figure 3:
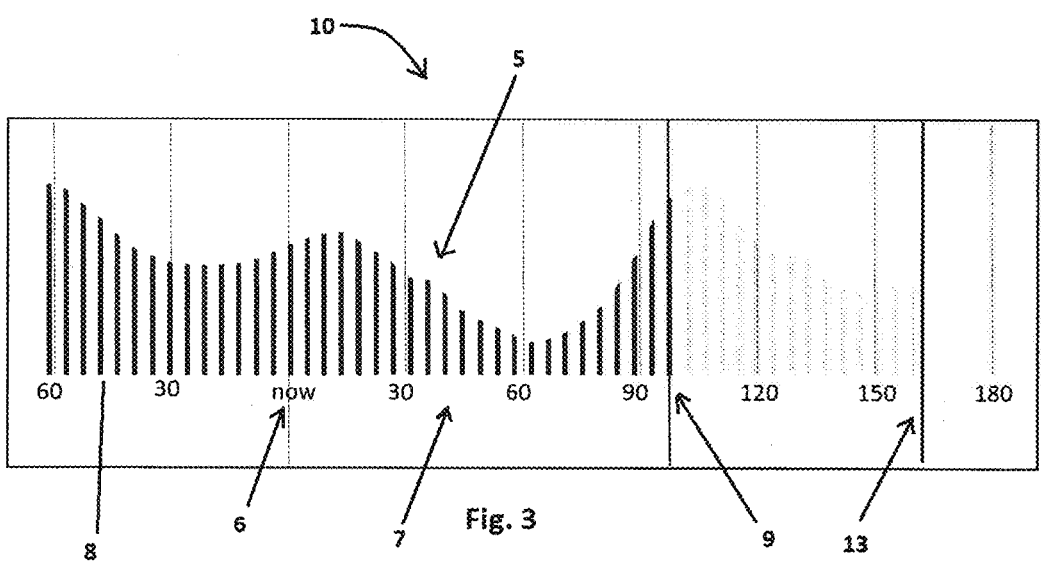
FIG. 3 schematically shows a second embodiment of the ship state visualization.

FIG. 3 schematically shows a second embodiment of the ship state visualization 10. The time axis 8 in this figure is not depicted as a solid line as in FIG. 2, but rather it is depicted by the numerals indicating the time.

The ship state visualization 10 of this figure additionally includes a vertical line 13 indicating a future time where the accuracy drops below a second pre-set accuracy where the ship state prediction 5 is deemed completely unreliable. The ship state prediction between the maximum prediction time 9 and the vertical line 13 is faded out using a grey-scale and the ship state prediction 5 to the right of the vertical line 13 is not shown.

The ship state prediction 5 in this embodiment is represented by a column diagram. The ship state which is predicted and whose ship state prediction 5 is shown in FIG. 3 may differ from that which is predicted in FIG. 2. For example, FIG. 2 may be related to a ship motion prediction 5 whereas FIG. 3 is related to a ship motion severity prediction 5. In embodiments both ship state predictions 5 may be shown at the same time or alternatively, e.g. depending on the wishes of a user.

Figure 4:
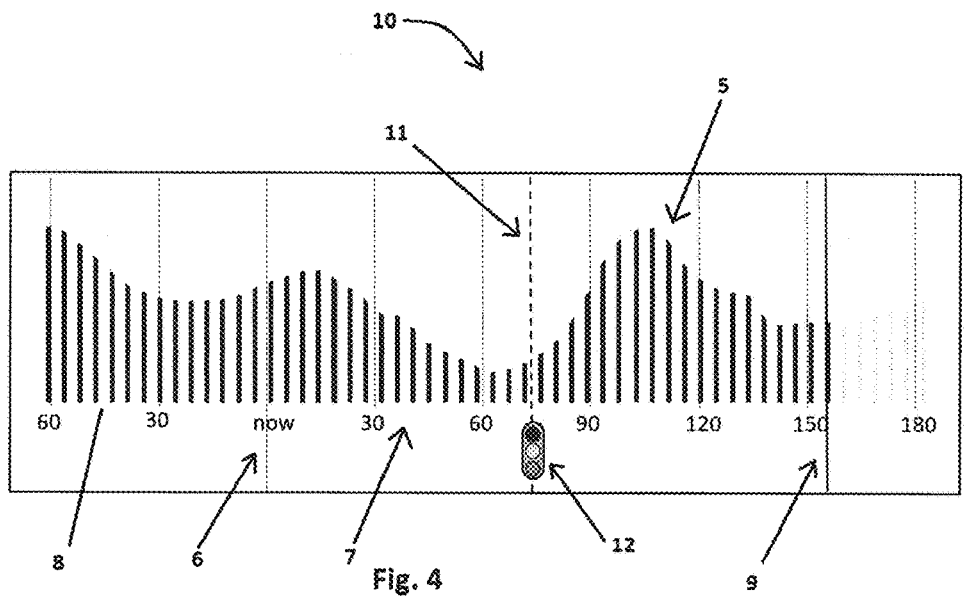
FIG. 4 schematically shows a third embodiment of the ship state visualization.

FIG. 4 schematically shows a third embodiment of the ship state visualization 10 wherein an example is shown of the user variable time 11. The user variable time 11 allows the representation of the ship state prediction 5 to be split in a non-updated portion, between the current time 6 and the user variable time 11, and an updated portion, to the right of the user variable time 11.

When the ship state prediction 5 is continuously updated, the representation of the ship state prediction 5 on the display 4 may change, e.g. due to more accurate predictions or updated measured wave fields. If such a change happens close to the current time 6, for example if such a change changes the ship state prediction 5 from below a pre-set limit value to above the pre-set limit value, this change may reduce the perceived reliability of the system. In order to prevent this reduction the representation of the ship state prediction 5 of this embodiment is split into a portion that is not updated, e.g. that only scrolls, and a portion that is updated, e.g. that additionally changes the predicted ship state. These two portions are determined by the user variable time 11. In this embodiment the user variable time lies after the maximum prediction time 9 so that changes in the ship state prediction 5 are smaller because the accuracy is higher.

The user variable time 11 in this example set to around t=75. In embodiments it is possible for the user, or possibly the processor 2, to change the user variable time 11 to a different time, for example to t=120.

As can be seen in this figure the maximum prediction time 9 is to the right of the user variable time 11, meaning the maximum prediction time is further into the future. The ship state prediction 5 in the non-updated portion may thus be considered to be accurate.

FIG. 4 further shows a stop light 12. In this embodiment the stop light 12 is related to the user variable time 11. The stop light 12 is configured to indicate if the ship state prediction 5 does not exceed a pre-set value between the current time 6 and the user variable time 11 by flashing the green light. The stop light 12 is further configured to indicate if the ship state prediction 5 exceeds the pre-set value between the current time 6 and the user variable time 11 by flashing the red light. The stop light 12 is further configured to indicate when the pre-set value is about to be exceeded, e.g. when the ship state prediction exceeds the pre-set value between the user variable time 11 and the maximum prediction time 9, by flashing the orange light.

In embodiments the stop light 12 may have other functionality. For example, the stop light may be used to indicate that the accuracy of the ship state prediction 5 is below the pre-set accuracy, e.g. in the non-updated portion, e.g. in embodiments wherein the maximum prediction time 9 lies to the left of the user variable time 11.

Figure 5:
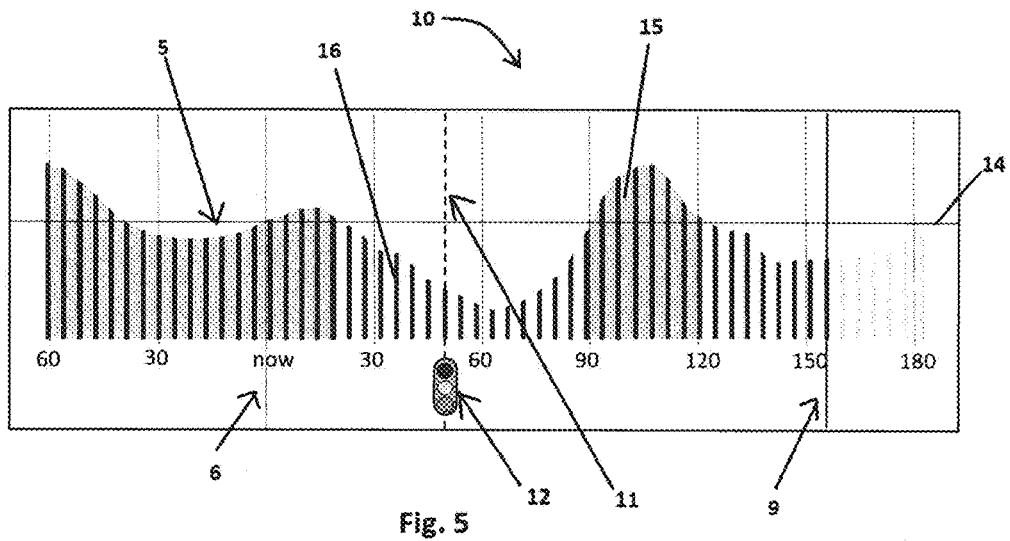
FIG. 5 schematically shows a fourth embodiment of the ship state visualization.

FIG. 5 schematically shows a fourth embodiment of the ship state visualization 10, wherein a horizontal line 14 indicates the pre-set limit value of the ship state prediction. Additionally, the user variable time 11 is set to t=50 which means in this example that the ship state visualization 10 will indicate when a range of 50 seconds or more of the ship state prediction 5 is below the pre-set limit value. In this example, the range between t=20 and t=90 is below the limit value and longer than 50 seconds, thus it is coloured differently, e.g. green 16, compared to the ranges t=(90, 120) and t=(−60,20), where may be coloured red 15. Thus a user can quickly see than a time interval of suitable length for performing operations is approaching.

In this embodiment, the stopping light 12 may indicate that the pre-set limit value will be exceeded in the near future, e.g. in a pre-set time period, by the ship state prediction 5 by flashing yellow. The stopping light 12 may further indicate, by flashing red, that the pre-set limit value is exceeded and it may indicate that the ship state prediction 5 is not exceeded and will not be exceeded in the near future by flashing green.

Figure 6:
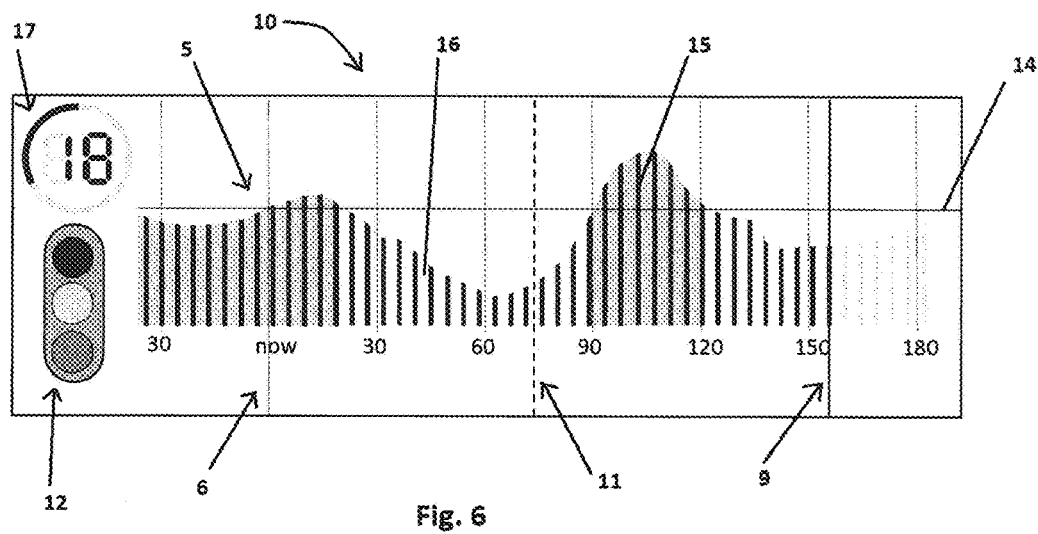
FIG. 6 schematically shows a fifth embodiment of the ship state visualization.

FIG. 6 schematically shows a fifth embodiment of the ship state visualization 10 similar to the embodiment of FIG. 5, wherein a countdown timer 17 is present to count down the time until the pre-set limit value is exceeded. In this embodiment the stopping light 12 is provided to the side of the ship state prediction 5 in stead of under the ship state prediction 5.

The various embodiments shown in the figures may be combined with other embodiments shown in the figures, e.g. in a single ship state visualization 10, or with features discussed in other parts herein.

What is claimed is:

1. A ship state prediction system comprising a processor, a wave sensor system and a display connected to the processor,
    wherein the wave sensor system is adapted to measure, in real time, wave fields and wherein the wave sensor system is configured for providing the measured wave fields to the processor;
    wherein the processor is configured to; continuously determine a ship state prediction of a ship state in a future time period based on the wave fields measured at a current time, to determine an accuracy of the ship state prediction in the future time period, to determine a maximum prediction time in the future time which corresponds to a the future time period where the accuracy drops below a pre-set accuracy, and to generate a ship state visualization to be displayed on the display;
    wherein the ship state visualization comprises a time axis comprising a time range including the current time and the future time period, relative to the current time;
    wherein the ship state visualization comprises a representation of the ship state prediction which is displayed on the future time period of the time axis; and
    wherein the ship state visualization comprises an indication of the maximum prediction time.

2. The ship state prediction system according to claim 1,
    wherein the processor is configured to determine the accuracy of the ship state prediction by correlating one or more previously determined ship state predictions to one or more measurements of the ship state corresponding to the one or more previously determined ship state predictions; and
    wherein the ship state measurements are measured by a ship state sensor.

3. The ship state prediction system according to claim 1, wherein the representation of the ship state prediction displayed on the display comprises a non-updated portion between current time and a user variable time in the future time period and a continuously updated portion after the user variable time in the future time period.

4. A ship state prediction system comprising a processor, a wave sensor system and a display connected to the processor,
    wherein the wave sensor system is adapted to measure, in real time, wave fields and wherein the wave sensor system is configured for providing the measured wave fields to the processor;
    wherein the processor is configured to continuously determine a continuously updated ship state prediction of a ship state in a future time period based on the wave fields measured at a current time;
    wherein the processor is configured to generate a ship state visualization to be displayed on the display;
    wherein the ship state visualization comprises a time axis comprising a time range including the current time and the future time period, relative to the current time;
    wherein the ship state visualization comprises a representation of the ship state prediction which is displayed on the future time period of the time axis; and
    wherein the representation of the ship state prediction displayed on the display comprises a non-updated portion between current time and a user variable time in the future time period and a continuously updated portion after the user variable time in the future time period.

5. The ship state prediction system according to claim 4,
    wherein the processor is further configured to determine an accuracy of the ship state prediction in the future time period;
    wherein the processor is further configured to determine a maximum prediction time which corresponds to a length of the future time period where the accuracy drops below a pre-set accuracy; and
    wherein the ship state visualization comprises an indication of the maximum prediction time.

6. The ship state prediction system according to claim 5,
    wherein the processor is configured to determine the accuracy of the ship state prediction by correlating one or more previously determined ship state predictions to one or more measurements of the ship state corresponding to the one or more previously determined ship state predictions; and
    wherein the ship state measurements are measured by a ship state sensor.

7. The ship state prediction system according to claim 4,
    wherein the processor is further configured to determine if the ship state prediction exceeds a pre-set limit value; and
    wherein the ship state visualization further comprises an indication when the ship state prediction exceeds the pre-set limit value.

8. The ship state prediction system according to claim 7, wherein the prediction system is configured to indicate a time duration until the ship state prediction exceeds the pre-set limit value.

9. The ship state prediction system according to claim 7, the prediction system further is configured to indicate if the ship state prediction does not exceed the pre-set limit value during a pre-set time period.

10. A method for predicting a ship state wherein the method comprises:
    measuring, in real time, wave fields with a wave sensor system;
    providing the measured wave fields to a processor;
    continuously determining, by the processor, a ship state prediction of a ship state in a future time period based on the wave fields measured at a current time;
    determining, by the processor, an accuracy in the future time period of the ship state prediction;
    determining, by the processor, a maximum prediction time which corresponds to the moment in the future time period where the accuracy of the ship state prediction drops below a pre-set accuracy;
    generating, by the processor, a ship state visualization comprising a time axis comprising a time range including the current time and the future time period, relative to the current time, wherein the ship state visualization comprises a representation of the ship state prediction which is displayed on the future time period of the time axis, and wherein the ship state visualization comprises an indication of the maximum prediction time in the future time period; and
    displaying the ship state visualization on a display.

11. The method according to claim 10,
    wherein the accuracy of ship state prediction is determined by the processor by correlating one or more previously determined ship state predictions to one or more measurements of the ship state corresponding to the one or more previously determined ship state predictions; and wherein the ship state measurements are measured by a ship state sensor.

12. The method according to claim 10, wherein the ship state prediction displayed on the display comprises a non-updated portion between current time and a user variable time in the future time period and a continuously updated portion after the user variable time in the future time period.

13. A method for predicting a ship state wherein the method comprises:

measuring, in real time, wave fields with a wave sensor system;

providing the measured wave fields to a processor;

continuously determining, by the processor, a ship state prediction of a ship state in a future time period based on the wave fields measured at a current time;

generating, by the processor, a ship state visualization comprising a time axis comprising a time range including the current time and the future time period, relative to the current time;

wherein the ship state visualization comprises a representation of the ship state prediction which is displayed on the future time period of the time axis; and wherein the representation of the ship state prediction displayed on a display, the representation comprising a non-updated portion between current time, a user variable time in the future time period, and a continuously updated portion after the user variable time in the future time period; and displaying the ship state visualization on a display.

14. The method according to claim 13, further comprising:

determining, by the processor, an accuracy in future time period of the ship state prediction; and determining, by the processor, a maximum prediction time which corresponds to the length of the future time period where the accuracy of the ship state prediction drops below a pre-set accuracy;

wherein the ship state visualization comprises an indication of the maximum prediction time.

15. The method according to claim 14, wherein the accuracy of ship state prediction is determined by the processor by correlating one or more previously determined ship state predictions to one or more measurements of the ship state corresponding to the one or more previously determined ship state predictions; and wherein the ship state measurements are measured by a ship state sensor.

16. The method according to claim 13, wherein the method further comprises:

determining, by the processor, if the ship state prediction exceeds a pre-set limit value;

wherein the ship state visualization further comprises an indication, which indicates when the ship state prediction exceeds the pre-set limit value.

17. The method according to claim 16, wherein the method further comprises:

indicating a time duration until the ship state prediction exceeds the pre-set limit value; and/or indicating if the ship state prediction does not exceed the pre-set limit value during a pre-set time period.

* * * * *